United States Patent
Suen et al.

(10) Patent No.: US 7,627,115 B2
(45) Date of Patent: *Dec. 1, 2009

(54) METHOD AND SYSTEM FOR IMPLEMENTING THE GEA3 ENCRYPTION ALGORITHM FOR GPRS COMPLIANT HANDSETS

(75) Inventors: Ruei-Shiang Suen, Dublin, CA (US); Srinivasan Surendran, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 855 days.

This patent is subject to a terminal disclaimer.

(21) Appl. No.: 10/924,177

(22) Filed: Aug. 23, 2004

(65) Prior Publication Data
US 2006/0039556 A1    Feb. 23, 2006

(51) Int. Cl.
*H04L 9/00* (2006.01)
(52) U.S. Cl. .......................... 380/44; 380/28
(58) Field of Classification Search .................. 380/28, 380/37, 44
See application file for complete search history.

(56) References Cited

U.S. PATENT DOCUMENTS

| 5,381,480 | A | * | 1/1995 | Butter et al. | ................... | 380/37 |
| 5,497,263 | A | | 3/1996 | Masuda et al. | | |
| 5,727,062 | A | | 3/1998 | Ritter | | |
| 6,182,216 | B1 | | 1/2001 | Luyster | | |

(Continued)

FOREIGN PATENT DOCUMENTS

WO    WO03050784    4/2002

OTHER PUBLICATIONS

3GPP Ogganizational Partners, 3rd Generation Partnership Project: Technical Specification Group Services and System Aspects: 3G Security; Specification of the 3GPP Confidentiality and Integrity Algorithms; Document 1: f8 and f9 Specification (Release 4), 3GPP TS 35.201 V4.1.0 (Dec. 2001).*

(Continued)

*Primary Examiner*—Beemnet W Dada
*Assistant Examiner*—April Y Shan
(74) *Attorney, Agent, or Firm*—McAndrews, Held & Malloy, Ltd.

(57) ABSTRACT

In a wireless communication system, a method and system for implementing the GEA3 encryption algorithm for GPRS compliant handsets are provided. An intermediate value may be generated based on initialized input variables, a cipher key and a key modifier. A first processing block of output bits may be generated by a keystream generator from the intermediate value, the cipher key, and an indication of the processing block of output bits being processed. Additional processing blocks of output bits may also be generated by the keystream generator based on an immediately previous processing block of output bits, the intermediate value, the cipher key, and an indication of the processing block of output bits being processed. A restart signal may indicate that subsequent processing blocks of output bits may be generated by the keystream generator by utilizing the same cipher key and the generated intermediate value.

32 Claims, 6 Drawing Sheets

U.S. PATENT DOCUMENTS

| | | | |
|---|---|---|---|
| 6,199,162 B1 | 3/2001 | Luyster | |
| 6,356,636 B1 | 3/2002 | Foster et al. | |
| 7,184,549 B2 * | 2/2007 | Sorimachi et al. | 380/37 |
| 7,212,631 B2 * | 5/2007 | Averbuj et | 380/37 |
| 2002/0181709 A1 | 12/2002 | Sorimachi et al. | |
| 2002/0186841 A1 | 12/2002 | Averbuj et al. | |
| 2003/0007636 A1 | 1/2003 | Alves et al. | |
| 2004/0047466 A1 | 3/2004 | Feldman et al. | |
| 2004/0131180 A1 * | 7/2004 | Mazuz et al. | 380/37 |
| 2004/0156499 A1 * | 8/2004 | Heo et al. | 380/37 |
| 2004/0208321 A1 | 10/2004 | Wary | |
| 2005/0226407 A1 * | 10/2005 | Kasuya et al. | 380/28 |
| 2005/0238166 A1 | 10/2005 | Koshy et al. | |

OTHER PUBLICATIONS

Oxford English Dictionary, Second Edition, 1989, "Signal" (n.).*
3GPP Organizational Partners, "3$^{rd}$ Generation Partnership Project: Technical Specification Group Services and Systems Aspects, 3G Security, Specification of the 3GPP Confidentiality and Integrity Algorithms, Document 2: Katsumi Specification (Release 5)" 2002.
3GPP Organizational Partners, "3$^{rd}$ Generation Partnership Project: Technical Specification Group Services and Systems Aspects, 3G Security, Specification of the A5/3 Encryption Algorithms for GSM and ECSD, and the GEA3 Encryption Algorithm for GPRS, Document 1: A5/3 and GEA3 Specifications (Release 6)" 2002.
Marinis et al., On the Hardware Implementation of the 3GPP Confidentiality and Integrity Algorithms, ISC 2001, LNCS 2200, pp. 248-265, 2001, Springer-Verlag Berlin Heidelberg 2001.

* cited by examiner

METHOD AND SYSTEM FOR IMPLEMENTING THE GEA3 ENCRYPTION ALGORITHM FOR GPRS COMPLIANT HANDSETS

CROSS-REFERENCE TO RELATED APPLICATIONS/INCORPORATION BY REFERENCE

This application makes reference to:

U.S. application Ser. No. 10/924,219 filed Aug. 23, 2004;

U.S. application Ser. No. 10/924,002 filed Aug. 23, 2004;

U.S. application Ser. No. 10/923,954 filed Aug. 23, 2004; and

U.S. application Ser. No. 10/924,214 filed Aug. 23, 2004.

The above stated applications are hereby incorporated herein by reference in their entirety.

FIELD OF THE INVENTION

Certain embodiments of the invention relate to cryptography. More specifically, certain embodiments of the invention relate to a method and system for the GEA3 encryption algorithm for GPRS compliant handsets.

BACKGROUND OF THE INVENTION

In wireless communication systems, the ability to provide secure and confidential transmissions becomes a highly important task as these systems move towards the next generation of data services. Secure wireless transmissions may be achieved by applying confidentiality and integrity algorithms to encrypt the information to be transmitted. For example, the Global System for Mobile Communication (GSM) uses the A5 algorithm to encrypt both voice and data and the General Packet Radio Service (GPRS) uses the GEA algorithm to provide packet data encryption capabilities in GSM systems. The next generation of data services leading to the so-called third generation (3G) is built on GPRS and is known as the Enhanced Data rate for GSM Evolution (EDGE). Encryption in EDGE systems may be performed by either the A5 algorithm or the GEA algorithm depending on the application. One particular EDGE application is the Enhanced Circuit Switch Data (ECSD).

There are three variants of the A5 algorithm: A5/1, A5/2, and A5/3. The specifications for the A5/1 and the A5/2 variants are confidential while the specifications for the A5/3 variant are provided by publicly available technical specifications developed by the 3rd Generation Partnership Project (3GPP). Similarly, three variants exist for the GEA algorithm: GEA1, GEA2, and GEA3. The specifications for the GEA3 variant are also part of the publicly available 3GPP technical specifications while specifications for the GEA1 and GEA2 variants are confidential. The technical specifications provided by the 3GPP describe the requirements for the A5/3 and the GEA3 algorithms but do not provide a description of their implementation.

Variants of the A5 and GEA algorithms are based on the KASUMI algorithm which is also specified by the 3GPP. The KASUMI algorithm is a symmetric block cipher with a Feistel structure or Feistel network that produces a 64-bit output from a 64-bit input under the control of a 128-bit key. Feistel networks and similar constructions are product ciphers and may combine multiple rounds of repeated operations, for example, bit-shuffling functions, simple non-linear functions, and/or linear mixing operations. The bit-shuffling functions may be performed by permutation boxes or P-boxes. The simple non-linear functions may be performed by substitution boxes or S-boxes. The linear mixing may be performed using XOR operations. The 3GPP standards further specify three additional variants of the A5/3 algorithm: an A5/3 variant for GSM, an A5/3 variant for ECSD, and a GEA3 variant for GPRS (including Enhanced GPRS or EGPRS).

The GEA3 variant utilizes the KASUMI algorithm as a keystream generator in an Output Feedback Mode (OFB). All three variants of the A5/3 algorithm may be specified in terms of a general-purpose keystream function KGCORE. The encryption algorithm for GPRS may be defined by mapping its corresponding inputs to KGCORE function inputs, and mapping KGCORE function outputs to outputs of the encryption algorithm. The heart of the KGCORE function is the KASUMI cipher block, and this cipher block may be used to implement the GEA3 algorithm.

Implementing the GEA3 algorithm directly in a GEA3 algorithm block or in a KGCORE function block, however, may require ciphering architectures that provide fast and efficient execution in order to meet the transmission rates, size and cost constraints required by next generation data services and mobile systems. Because of their complexity, implementing the GEA3 algorithm in embedded software to be executed on a general purpose processor on a system-on-chip (SOC) or on a digital signal processor (DSP), may not provide the speed or efficiency necessary for fast secure transmissions in a wireless communication network. Moreover, these processors may need to share some of their processing or computing capacity with other applications needed for data processing and/or transmission, further limiting processing resources available for encryption applications. The development of cost effective integrated circuits (IC) capable of accelerating the encryption and decryption speed of the GEA3 algorithm is necessary for the deployment of next generation data services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for implementing the GEA3 encryption algorithm for GPRS compliant handsets. Aspects of the method may comprise initializing a keystream generator with input variables. An intermediate value, which is utilized to generate an output keystream, may be generated based on the input variables, a cipher key and a key modifier. A modified cipher key may be generated by XORing the cipher key and the key modifier. At least a portion of a set of subkeys utilized during a KASUMI operation may be generated from the cipher key after a signal is generated to indicate that the set of subkeys is to be generated.

After generating a first processing block of output bits and a signal that indicates when the first processing block of output bits is generated, at least one additional processing block of output bits may be generated utilizing an immediately generated previous processing block of output bits, the generated intermediate value, the cipher key, and an indication corresponding to a processing block of output bits being processed. The additional processing block of output bits may be generated after a signal that indicates when an immediately generated previous processing block of output bits is to be generated. The immediately generated previous processing block of output bits may be pipelined transferred from a previous processing stage to a current processing stage when a signal is generated to indicate when an immediately generated previous processing block of output bits is available for processing. Moreover, generating the indication corresponding to a processing block of output bits being processed may be performed by counting the number of occurrences of the signal that indicates when an immediately generated previous processing block of output bits is generated.

Subsequent processing blocks of output bits may be generated in response to receiving a signal that indicates when at least one subsequent processing block of output bits is to be generated utilizing the cipher key. The subsequent processing blocks of output bits may be generated utilizing an immediately generated previous processing block of output bits, the generated intermediate value, the cipher key, and an indication corresponding to a processing block of output bits being processed. The subsequent processing block of output bits may be generated after a signal that indicates when an immediately generated previous processing block of output bits is generated. As with additional processing blocks of output bits, the immediately generated previous processing block of output bits may be pipelined transferred from a previous processing stage to a current processing stage when a signal is generated to indicate when an immediately generated previous processing block of output bits is available.

The intermediate value may be generated by performing the KASUMI operation on the input variables with the modified cipher key after a signal is generated to indicate that the KASUMI operation is to begin. A first processing input may be generated by XORing the generated intermediate value and the indication corresponding to a processing block of output bits being processed. The first processing input and the cipher key may be utilized to generate the first processing block of output bits by performing the KASUMI operation after a signal is generated to indicate that the KASUMI operation is to begin.

The method may also comprise generating at least one additional processing input to generate the additional processing blocks of output bits by XORing the immediately generated previous processing block of output bits with the result of XORing the generated intermediate value and the indication corresponding to a processing block of output bits being processed. The additional processing blocks of output bits may be generated by performing the KASUMI operation on the generated additional processing inputs with the cipher key after a signal is generated to indicate that the KASUMI operation is to begin.

The method may further comprise generating at least one subsequent processing input to generate the subsequent processing blocks of output bits by XORing the immediately generated previous processing block of output bits with the result of XORing the generated intermediate value and the indication corresponding to a processing block of output bits being processed. The subsequent processing blocks of output bits may be generated by performing the KASUMI operation on the generated subsequent processing inputs with the cipher key after a signal is generated to indicate that the KASUMI operation is to begin. Moreover, a selection between the input variables and at least one generated processing inputs may be performed to determine an input to the KASUMI operation.

A signal that indicates a last of the additional processing blocks of output bits and a signal that indicates a last of the subsequent processing blocks of output bits may be generated. The first processing block of output bits, the additional processing blocks of output bits, and the subsequent processing blocks of output bits may be grouped or combined into a final set of blocks of output bits for an output keystream.

Aspects of the system may comprise circuitry for initializing a keystream generator with input variables. Circuitry may be provided to generate an intermediate value, which is utilized to generate an output keystream, based on the input variables, a cipher key and a key modifier. A modified cipher key may be generated by circuitry adapted to perform the XORing of the cipher key and the key modifier. Circuitry may be provided to generate at least a portion of a set of subkeys utilized during a KASUMI operation from the cipher key, after a signal is generated to indicate that the set of subkeys is to be generated.

Circuitry may be provided to generate a first processing block of output bits and a signal that indicates when the first processing block of output bits is generated. Circuitry may also be provided for generating at least one additional processing block of output bits utilizing an immediately generated previous processing block of output bits, the generated intermediate value, the cipher key, and an indication corresponding to a processing block of output bits being processed. The additional processing block of output bits may be generated after circuitry generates a signal that indicates when an immediately generated previous processing block of output bits is to be generated. Additional circuitry may be provided to pipeline transfer the immediately generated previous processing block of output bits from a previous processing stage to a current processing stage when a signal is generated to indicate that an immediately generated previous processing block of output bits is available for processing. Moreover, generating the indication corresponding to a processing block of output bits being processed may be performed by circuitry adapted to count the number of occurrences of the signal that indicates when an immediately generated previous processing block of output bits is generated.

Subsequent processing blocks of output bits may be generated by circuitry adapted to respond to a signal that indicates when at least one subsequent processing block of output bits is to be generated utilizing the cipher key. The subsequent processing blocks of output bits may be generated by circuitry that utilizes an immediately generated previous processing block of output bits, the generated intermediate value, the cipher key, and an indication corresponding to a processing block of output bits being processed. The subsequent processing block of output bits may be generated after circuitry generates a signal that indicates when an immediately generated previous processing block of output bits is to be generated. As with additional processing blocks of output bits, additional circuitry may be provided to pipeline transfer the immediately generated previous processing block of output bits from a previous processing stage to a current processing stage when a signal is generated to indicate that an immediately generated previous processing block of output bits is available for processing.

The intermediate value may be generated by circuitry adapted to perform the KASUMI operation on the input variables with the modified cipher key after a signal is generated to indicate that the KASUMI operation is to begin. A first processing input may be generated by circuitry for XORing the generated intermediate value and the indication corresponding to a processing block of output bits being processed. Circuitry may be provided to generate the first processing block of output bits by performing the KASUMI operation on the first processing input with the cipher key after a signal is generated to indicate that the KASUMI operation is to begin.

The system may also comprise circuitry for generating at least one additional processing input to generate the additional processing blocks of output bits by XORing the immediately generated previous processing block of output bits with the result of XORing the generated intermediate value and the indication corresponding to a processing block of output bits being processed. The additional processing blocks of output bits may be generated by circuitry adapted to perform the KASUMI operation on the generated additional processing inputs with the cipher key after a signal is generated to indicate that the KASUMI operation is to begin.

The system may further comprise circuitry for generating at least one subsequent processing input to generate the subsequent processing blocks of output bits by XORing the immediately generated previous processing block of output bits with the result of XORing the generated intermediate value and the indication corresponding to a processing block of output bits being processed. The subsequent processing blocks of output bits may be generated by circuitry adapted to perform the KASUMI operation on the generated subsequent processing inputs with the cipher key after a signal is generated to indicate that the KASUMI operation is to begin. Moreover, additional circuitry may be provided to select between the input variables and at least one generated processing input to determine an input to the KASUMI operation.

Circuitry may also be provided to generate a signal that indicates a last of the additional processing blocks of output bits and a signal that indicates a last of the subsequent processing blocks of output bits. Circuitry for grouping the first processing block of output bits, the additional processing blocks of output bits, and the subsequent processing blocks of output bits into a final set of blocks of output bits may be provided.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for implementing the GEA3 encryption algorithm for GPRS compliant handsets. A finite state machine may be utilized to control the operation and data processing of a keystream generator system for General Packet Radio Service applications. A plurality of processing stages may be controlled by the finite state machine, where each processing stage may reuse a plurality of processing hardware blocks in the keystream generator system in accordance to the selected mode of operation. This approach may provide a cost effective integrated circuit (IC) solution capable of accelerating the encryption and decryption speed of a GPRS variant of the GEA3 algorithm and allow for a faster deployment of next generation data services.

Figure 1:
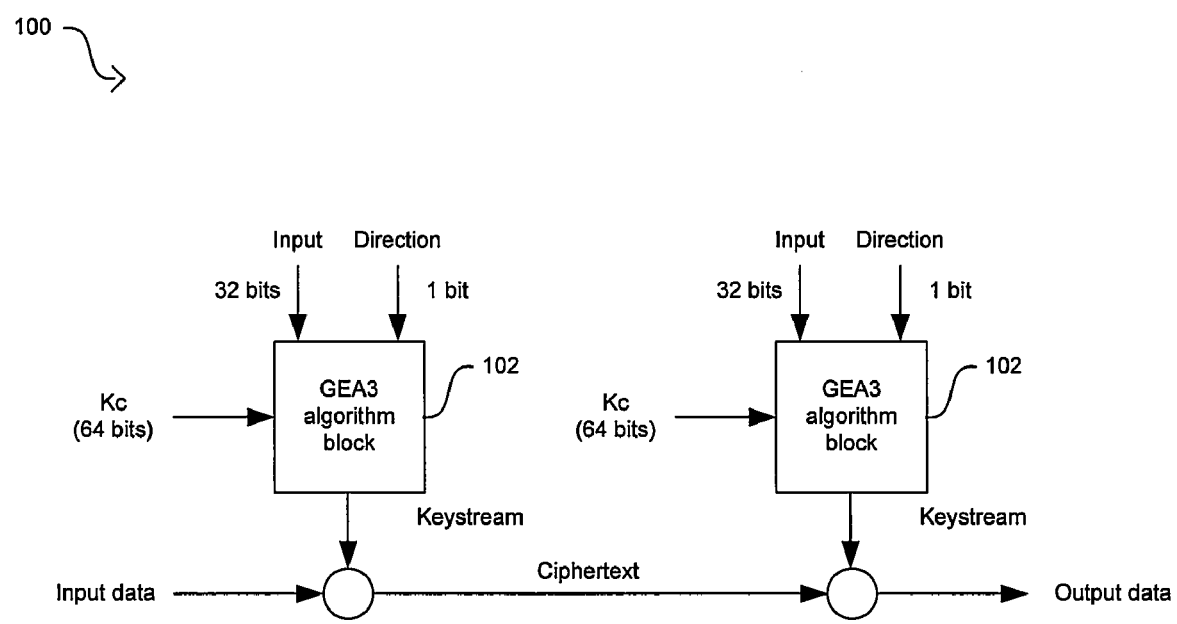
FIG. 1 is a block diagram of an exemplary A5/3 data encryption system for GSM communications, as disclosed in 3rd Generation Partnership Project, Technical Specification Group Services and System Aspects, 3G Security, Specification of the A5/3 Encryption Algorithms for GSM and ECSD, and the GEA3 Encryption Algorithm for GPRS, Document 1, A5/3 and GEA3 Specifications, Release 6 (3GPP TS 55.216 V6.1.0, 2002-12).

FIG. 1 is a block diagram of an exemplary A5/3 data encryption system for GSM communications, as disclosed in 3rd Generation Partnership Project, Technical Specification Group Services and System Aspects, 3G Security, Specification of the A5/3 Encryption Algorithms for GSM and ECSD, and the GEA3 Encryption Algorithm for GPRS, Document 1, A5/3 and GEA3 Specifications, Release 6 (3GPP TS 55.216 V6.1.0, 2002-12). Referring to FIG. 1, the GPRS/EGPRS encryption system 100 may comprise a plurality of GEA3 algorithm blocks 102. The GEA3 algorithm block 102 may be used for data encryption in GPRS and may also be used in EGPRS which achieves higher data rates through an 8 Phase Shift Key (PSK) modulation scheme. A Logical Link Control (LLC) layer is the lowest protocol layer that is common to both an MS and a Serving GPRS Support Node (SGSN). As a result, the GEA3 encryption may take place on the LLC layer.

When ciphering is initiated, a higher layer entity, for example, Layer 3, may provide the LLC layer with a 64-bit key, $K_C$, which may be used as an input to the GEA3 algorithm block 102. The LLC layer may also provide the GEA3 algorithm block 102 with a 32-bit INPUT parameter and a 1-bit DIRECTION parameter. The GEA3 algorithm block 102 may also be provided with the number of octets of OUTPUT keystream data required. The DIRECTION parameter may specify whether the current keystream will be used for upstream or downstream communication, as both directions use a different keystream. The INPUT parameter may be used so that each LLC frame is ciphered with a different segment of the keystream. This parameter is calculated from the LLC frame number, a frame counter, and a value supplied by the SGSN called the Input Offset Value (IOV).

Figure 2:
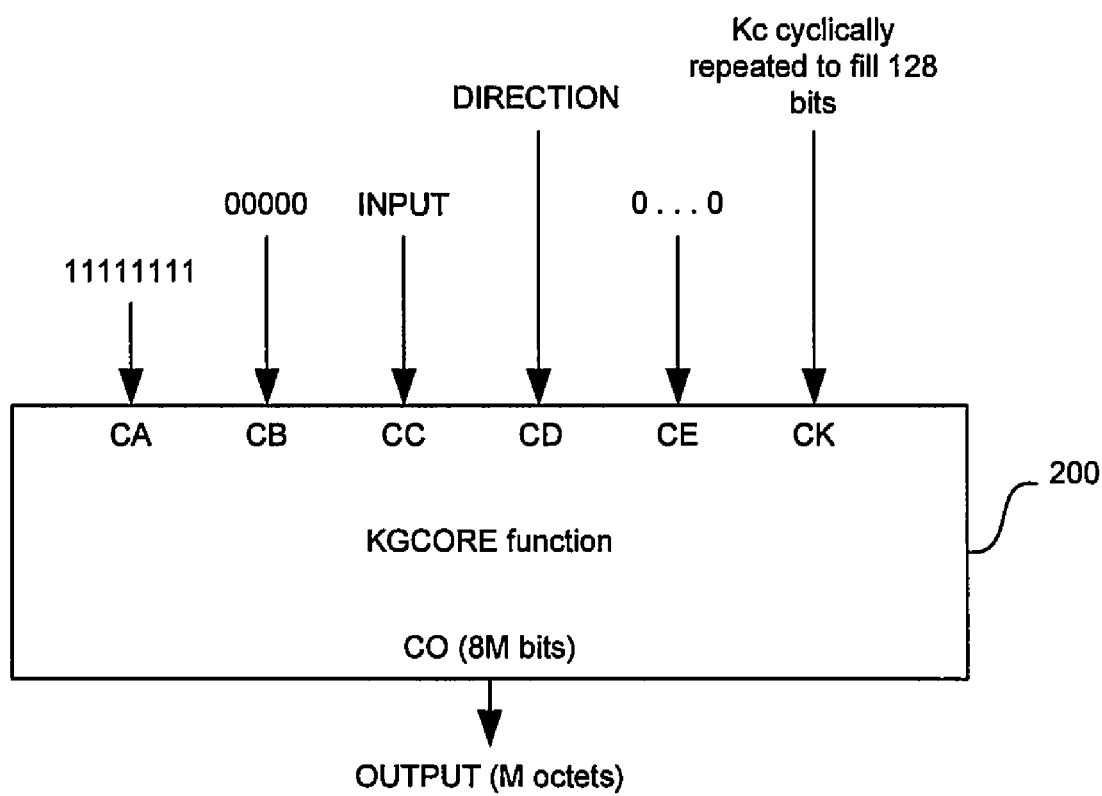
FIG. 2 is a diagram of an exemplary variable initialization for a general purpose keystream generator function KGCORE to operate as a GPRS GEA3 keystream generator function, which may be utilized in connection with an embodiment of the invention.

FIG. 2 is a diagram of an exemplary set-up for a KGCORE function block to operate as a GEA3 keystream generator function, which may be utilized in connection with an embodiment of the invention. Referring to FIG. 2, the KGCORE function block 200 may be used to map the GPRS GEA3 algorithm inputs and outputs to the inputs and outputs of the KGCORE function. For example, the CL parameter specifies the number M of octets of output required, producing a total of 8M bits of output. In this case, the outputs CO[0] to CO[8M−1] of the KGCORE function block 200 may map to the outputs of the GEA3 algorithm by OUTPUT[i]=CO[8i] ... CO[8i+7], where $0 \leq i \leq M-1$.

Figure 3:
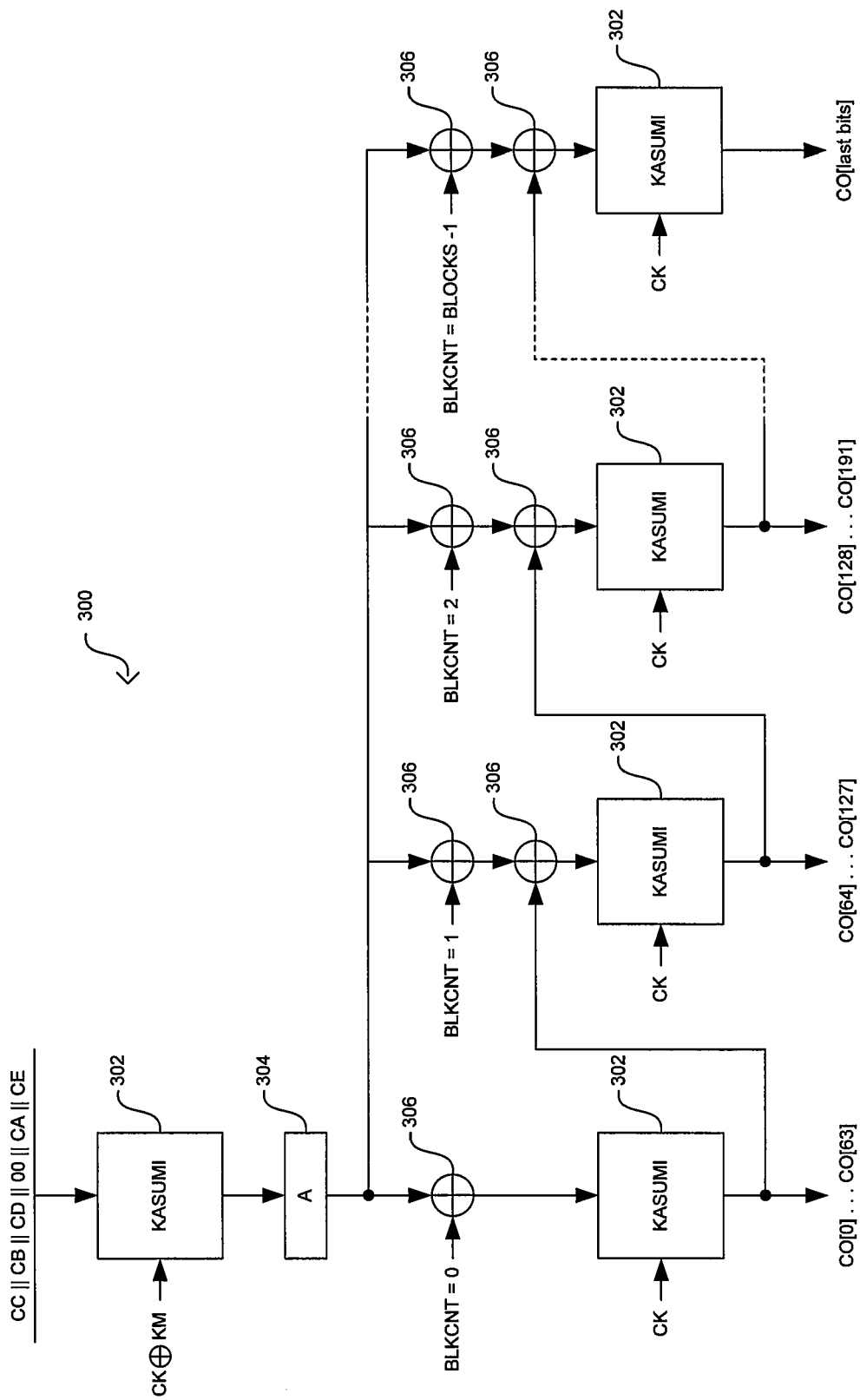
FIG. 3 is a flow diagram that illustrates the operation of a general purpose keystream generator function KGCORE, which may be utilized in connection with an embodiment of the invention.

FIG. 3 is a flow diagram that illustrates the operation of a general-purpose keystream generator function KGCORE, which may be utilized in connection with an embodiment of the invention. Referring to FIG. 3, the general-purpose keystream generator function KGCORE 300 may comprise a plurality of KASUMI operations 302, a plurality of 64-bit XOR operations 306, and an intermediate value A register 304. The KASUMI operation 302 may comprise suitable logic, circuitry, and/or code that may be adapted to perform a KASUMI algorithm, where the KASUMI algorithm is a symmetric block cipher that produces a 64-bit output from a 64-bit input under the control of a 128-bit cipher key parameter CK. The 64-bit XOR operation 306 may comprise suitable logic, circuitry, and/or code that may be adapted to perform a bit-wise XOR operation on two 64-bit inputs to produce a 64-bit output. The intermediate value A register 304 may comprise suitable logic, circuitry, and/or code that may be adapted to store an intermediate value A generated by an initializing KASUMI operation that operates on a set of input variables to the general-purpose keystream generator function KGCORE 300 with a modified cipher key. The intermediate value A register 304 may be, for example, a 64-bit register.

In operation, the set of input variables that correspond to the GPRS variant of the GEA3 algorithm may be transferred to the general-purpose keystream generator function KGCORE 300. The set of input variables may comprise the parameters CA, CB, CC, CD, CD, CE, CL, and CK, where CA is an 8-bit input parameter, CB is a 5-bit input parameter, CC is a 32-bit input parameter, CD is a 1-bit input parameter, CE is a 16-bit input parameter, CL is an integer in the range $1 \ldots 2^{19}$ that specifies the numbers of output bits, and CK is a 128-bit input parameter that corresponds to a privacy or cipher key, Kc, and that may be utilized for encryption and decryption by the general-purpose keystream generator function KGCORE 300. The cipher key Kc may be of any length between 64 bits and 128 bits long, where the bit length of Kc may be provided by an input parameter KLEN. The data in parameters CA, CB, CC, CD, CD, and CE may be stored in the intermediate value A register 304 in the following order: A=CC∥CB∥CD∥0 0∥CA∥CE, where the ∥ operation represents concatenation and two zeros may be added between parameters CD and CA to complete the 64 bits of data in the intermediate value A register 304. The bit ordering of the parameters in the intermediate value A register 304 may be done fhrom least significant bit to most significant bit, for example, A[0]...A[63]=CC[0]...CC[31] CB[0]...CB[4] CD[0] 0 0 CA[0]...CA[7]...CE[15].

The input variables to the general-purpose keystream generator function KGCORE 300 may be initialized to map to the inputs of the GPRS variant of the GEA3 algorithm:

CA[0]...CA[7] = 1 1 1 1 1 1 1 1,
CB[0]...CB[4] = 0 0 0 0 0,
CC[0]...CC[31] = INPUT[0]...INPUT[31],
CD[0] = 0,
CE[0]...CE[15] = 0 0 0 0 0 0 0 0 0 0 0 0 0 0 0 0, and
CL = 8*M, where the CC parameter may be initialized to correspond to the 32-bit wide INPUT parameter and the factor M in the CL parameter may correspond to the number of output keystream octets to be generated. The cipher key parameter CK may be initialized to correspond to the privacy or cipher key Kc as follows: CK[0] ... CK[KLEN-1]=$K_C$[0] ... $K_C$[KLEN-1]. For the case when KLEN<128, then CK[KLEN] ... CK[127]= $K_C$[0] ... $K_C$[127−KLEN], so that for KLEN=64, then CK=$K_C$∥$K_C$.

Moreover, the outputs of the general-purpose keystream generator function KGCORE 300 may be initialized to map to the outputs of the GPRS variant of the GEA3 algorithm:

OUTPUT[i]=$CO[8*i] \ldots CO[8*i+7]$, for $0 \leq i \leq M-1$, where OUTPUT[i] corresponds to the keystream bits output by the GPRS variant of the GEA3 algorithm and CO is an output parameter of the general-purpose keystream generator function KGCORE 300.

After initializing the input variables, an initializing KASUMI operation may be performed by a KASUMI operation 302 on the initialized data stored in the intermediate value A register 304. The initializing Kasumi operation may be represented as follows:

$$A=KASUMI \ [A]_{MCK},$$

where a KASUMI operation 302 may be performed on the initialized data in the intermediate value A register 304 utilizing a modified cipher key parameter MCK and the result of the KASUMI operation may be stored back into the intermediate value A register 304 for further processing. The cipher key parameter CK may be modified by a key modifier KM to obtain the modified cipher key parameter MCK, where MCK=CK⊕KM and ⊕ corresponds to a bit-wise XOR operation. The key modifier KM may be a 128-bit input variable, for example, KM=0x55555555555555555555555555555555.

Once the general-purpose keystream generator function KGCORE 300 has been initialized for GPRS applications, at least one processing stage may be initiated to generate the output bits for the output keystream. The general-purpose keystream generator function KGCORE 300 may produce output bits in blocks of 64 bits at a time. Each processing stage in the general-purpose keystream generator function KGCORE 300 may correspond to the generation of a processing block of 64 output bits. Because in the GPRS variant of the GEA3 algorithm the number of output bits in the output keystream is a multiple of 8, the total number of processing stages or processing blocks of outputs bits (BLOCKS) may be determined by rounding the ratio 8*M/64 to the nearest integer. For example, when CL=32 (M=4), the total number of processing stages or processing blocks of output bits is 1 (BLOCKS=1). In this example, the 32 most significant bits of the processing block of output bits may be utilized while the remaining 32 least significant bits may be discarded. In another example, when CL=984 (M=123), the total number of processing stages or processing blocks of output bits is 16 (BLOCKS=16). In this example, the 24 most significant bits of the last processing block of output bits may be utilized while the remaining 40 least significant bits may be discarded.

Each processing block of output bits (KSB) may be generated by performing the following KASUMI operation:

$$KSB_n=KASUMI[A \oplus BLKCNT \oplus KSB_{n-1}]_{CK}, \text{ for } 1 \leq n \leq BLOCKS,$$

where $KSB_n$ corresponds to the processing block of output bits in a current processing stage n, $KSB_{n-1}$ corresponds to the processing block of output bits from an immediately previous processing stage n−1, A is the intermediate value stored in the intermediate value A register 304, CK is the cipher key parameter generated from the cipher key Kc during the initialization process, BLOCKS is a parameter that corresponds to the total number of processing stages or processing blocks of output bits to be generated, and BLKCNT, where BLKCNT=n−1, is an indication of the processing stage or processing block of output bits currently being processed. The KASUMI operation and the XOR operations described for generating the processing blocks of output bits $KSB_n$ may be performed by the KASUMI operation 302 and by the 64-bit XOR operation 306 respectively.

When generating a first processing block of output bits ($KSB_1$) in a first processing stage, the processing input to the KASUMI operation 302 may be generated based on the values BLKCNT=0 and $KSB_0$=0, where the value 0 may be assigned to BLKCNT and $KSB_0$ during the initialization process. When generating additional processing blocks of output bits, for example, when generating a second processing block of output bits ($KSB_2$) in a second processing stage, the processing input to the KASUMI operation 302 may be generated based on the values BLKCNT=1 and $KSB_1$, where $KSB_1$ is the processing block of output bits from the first processing stage. A similar approach may be followed until the total number of processing stages are completed, where the total number of processing stages has been determined from parameter CL. For example, for the last processing stage, the processing input to the KASUMI operation 302 may be generated based on the values BLKCNT=BLOCKS−1 and $KSB_{BLOCKS}$−1.

Each bit in a processing block of output bits KSB may be mapped to a bit in the output parameter CO in the following manner:

$$CO[((n-1)*64)+i]=KSB_{n[i]}, \text{ for } 1 \leq n \leq \text{BLOCKS and } 0 \leq i \leq 63,$$

where n corresponds to the current processing block of output bits under consideration, and i is a mapping index. Referring back to FIG. 3, the first stage of processing may generate a first processing block of output bits $KSB_1[0]$ ... $KSB_1[63]$= CO[0] ... CO[63]. The second stage of processing may generate a second processing block of output bits $KSB_2$ [0] ... $KSB_2[63]$=CO[64] ... CO[127]. A similar approach followed for any additional or subsequent processing stages. For example, in the case when CL=248 (M=31) the last processing stage may generate a last processing block of output bits $KSB_4[0]$ ... $KSB_4[55]$=CO[192] ... CO[247], where $KSB_4[56]$ ... $KSB_4[63]$ may be discarded.

Figure 4:
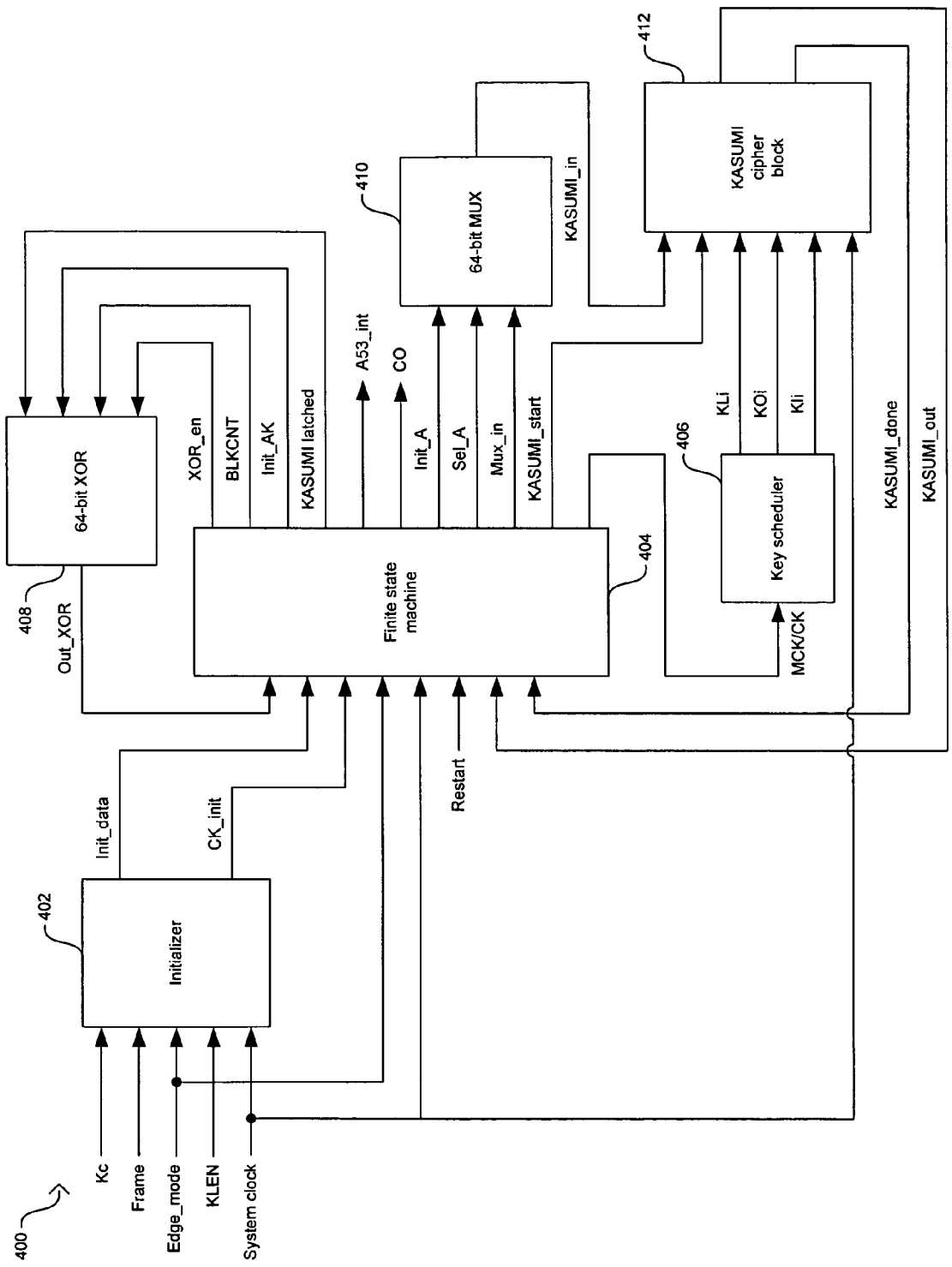
FIG. 4 is a block diagram of an exemplary GEA3 keystream generating system for operating the general purpose keystream generator function KGCORE as a GPRS GEA3 keystream generator function, in accordance with an embodiment of the invention.

FIG. 4 is a block diagram of an exemplary GEA3 keystream generating system for operating the general purpose keystream generator function KGCORE as a GPRS GEA3 keystream generator function, in accordance with an embodiment of the invention. Referring to FIG. 4, the GEA3 keystream generating system 400 may comprise an initializer 402, a finite state machine 404, a key scheduler 406, a 64-bit XOR 408, a 64-bit MUX 410, and a KASUMI cipher block 412. The initializer 402 may comprise suitable logic, circuitry, and/or code that may be adapted to map the inputs of the GPRS variant of the GEA3 algorithm to the inputs of the general-purpose keystream generator function KGCORE 300. The finite state machine 404 may comprise suitable logic, circuitry, and/or code that may be adapted to control the operation and data processing flow of the GEA3 keystream generating system 400. The finite state machine 404 may receive a plurality of input signals and may generate a plurality of output signals in order to perform the operation control and data processing flow control of the GEA3 keystream generating system 400. The finite state machine 404 may be configured and/or adapted to accommodate modifications and/or changes in the specifications of the GEA3 encryption algorithm for GPRS applications.

The key scheduler 406 may comprise suitable logic, circuitry, and/or code that may be adapted to generate a set of subkeys KLi, KOi, and Kli from the cipher key parameter CK, where the set of subkeys may be utilized in the KASUMI algorithm of the KASUMI operation 302 in FIG. 3 and i is an index that corresponds to the current round of processing in the eight-round KASUMI algorithm. The key schedule 406 may generate at least a portion of the set of subkeys before the start of the KASUMI operation. The 64-bit XOR 408 may comprise suitable logic, circuitry, and/or code that may be adapted to perform a bit-wise XOR operation. A portion of the operation of the 64-bit XOR 408 may correspond to that of at least one 64-bit XOR operation 306 in FIG. 3. The 64-bit MUX 410 may comprise suitable logic, circuitry, and/or code that may be adapted to select the input to the KASUMI cipher block 412. The KASUMI cipher block 412 may comprise suitable logic, circuitry, and/or code that may be adapted to perform the KASUMI algorithm. A portion of the operation of the KASUMI cipher block 412 may correspond to that of at least one KASUMI operation 302 in FIG. 3.

In operation, the initializer 402 may receive the cipher key Kc, frame information, the KLEN parameter, an Edge_mode input signal, and a system clock. Additional input signals may also be received by the initializer 402. The initializer 402 may utilize the frame information and the Edge_mode input signal to generate an Init_data signal that corresponds to the initialized data for parameters CA, CB, CC, CD, CD, and CE. The Edge_mode input signal may indicate whether the GEA3 keystream generating system 400 is to operate in a GPRS mode. The frame information may provide the initializer 402 with the INPUT parameter to initialize the parameter CC. The initializer 402 may also generate a CK_init signal from the cipher key Kc and the KLEN parameter, where the CK_init signal may correspond to the cipher key parameter CK. The initialized input variables and the generated cipher key parameter Ck may be transferred to the finite state machine 404 for further processing. The finite state machine 404 may generate the modified cipher key parameter (MCK) from the cipher key parameter CK and the key modifier KM and may transfer MCK to the key scheduler 406 to generate a set of subkeys that may be utilized for the initializing KASUMI operation. The finite state machine 404 may store the value of the key modifier KM.

The finite state machine 404 may select the Init_A signal to be multiplexed out of the 64-bit MUX 410 as the output signal KASUMI_in, where the Init_A input signal may correspond to the initialized input variables. The finite state machine 404 may generate the KASUMI_start signal to indicate to the KASUMI cipher block 412 that the KASUMI_in signal and the set of subkeys generated from the modified cipher key parameter MCK may be available for processing. The KASUMI cipher block 412 may generate the intermediate value A and may transfer the results to the finite state machine 404 through the KASUMI_out signal. The KASUMI cipher block 412 may also generate the KASUMI_done signal to indicate that the initializing KASUMI operation has been completed.

The finite state machine 404 may proceed to generate at least one processing block of output bits after the intermediate value A has been determined. For example, to generate the first processing block of output bits, $KSB_1$, the finite state machine 404 may transfer the cipher key parameter CK to the key scheduler 406 to generate a set of subkeys that may be utilized for the first KASUMI operation. The finite state machine 404 may enable the 64-bit XOR 408 via signal XOR_en to generate a first processing input to be utilized during a first processing stage to generate the first processing block of output bits $KSB_1$. The 64-bit XOR 408 may XOR the BLKCNT signal and the Init_AK signal to generate the first processing input, where BLKCNT=0 and Init_AK is the intermediate value A. The output Out_XOR from the 64-bit XOR 408 may be transferred to the finite state machine 404 where it may be transferred to the 64-bit MUX 410 as signal Mux_in.

The finite state machine 404 may select the Mux_in signal to be multiplexed out of the 64-bit MUX 410 as the output signal KASUMI_in, where the Mux_in input signal may correspond to the first processing input. The finite state machine 404 may generate the KASUMI_start signal to indicate to the KASUMI cipher block 412 that the KASUMI_in signal and the set of subkeys generated from the cipher key parameter CK may be available for processing. The KASUMI cipher block 412 may generate the first processing block of output bits and may transfer the results to the finite state machine 404 through the KASUMI_out signal, where the finite state machine 404 may latch the values of the KASUMI_out signal for processing in the next processing stage. The KASUMI cipher block 412 may also generate the KASUMI_done signal to indicate that the KASUMI operation corresponding to the first processing stage has been completed. The finite state machine 404 may update the value of the BLKCNT signal after receiving the KASUMI_done signal from the KASUMI cipher 412 or after sending the KASUMI_start signal to the KASUMI cipher 412.

The finite state machine 404 may proceed to generate additional processing block of output bits after the first processing block of output bits has been determined. For example, to generate the second processing block of output bits, $KSB_2$, the KASUMI cipher block 412 may utilize the set of subkeys generated by the key scheduler 406 for the first KASUMI operation. The finite state machine 404 may enable the 64-bit XOR 408 via signal XOR_en to generate a second processing input to be utilized during a second processing stage to generate the second processing block of output bits $KSB_2$. The 64-bit XOR 408 may XOR the BLKCNT signal, the Init_AK signal, and the immediately previous processing block of output bits to generate the second processing input, where BLKCNT=1, Init_AK is the intermediate value A, and the immediately previous processing block of output bits $KSB_1$ corresponds to the latched KASUMI_out values from the previous processing stage. The output Out_XOR from the 64-bit XOR 408 may be transferred to the finite state machine 404 where it may be transferred to the 64-bit MUX 410 as signal Mux_in.

The finite state machine 404 may select the Mux_in signal to be multiplexed out of the 64-bit MUX 410 as the output signal KASUMI_in, where the Mux_in input signal may correspond to the second processing input. The finite state machine 404 may generate the KASUMI_start signal to indicate to the KASUMI cipher block 412 that the KASUMI_in signal and the set of subkeys generated from the cipher key parameter CK may be available for processing. The KASUMI cipher block 412 may generate the second processing block of output bits and may transfer the results to the finite state machine 404 through the KASUMI_out signal. The KASUMI cipher block 412 may also generate the KASUMI_done signal to indicate that the KASUMI operation corresponding to the second processing stage has been completed. The finite state machine 404 may update the value of the BLKCNT signal after receiving the KASUMI_done signal from the KASUMI cipher 412 or after sending the KASUMI_start signal to the KASUMI cipher 412. A similar approach may be followed for the remaining additional processing blocks of output bits as determined from the CL parameter. In this regard, the finite state machine 404 may follow the approach described above and control the operation and data flow control of the GEA3 keystream generating system 400 to generate the additional processing blocks of output bits.

After completing the additional processing stages, the finite state machine 404 may receive a restart signal to generate a plurality of subsequent processing blocks of output bits in subsequent processing stages by utilizing the generated intermediate value A and the set of subkeys generated from the cipher key parameter CK. In this regard, the finite state machine 404 may follow the approach described above for generating the additional processing blocks of output bits to control the operation and data flow of the GEA3 keystream generating system 400 to generate the subsequent processing blocks of output bits.

The finite state machine 404 may generate the output parameter CO based on the output bits provided by each processing stage and may discard the appropriate bits in the processing block of output bits. When all the output bits in the output keystream are generated, the finite state machine 404 may generate a GEA3_int interrupt signal to indicate that all the output bits for the output keystream have been generated and the GEA3 keystream generating system 400 is ready to start processing a new set of input variables or to receive a restart signal to generate subsequent processing blocks of output bits. A system clock signal may be used during the initialization and during the processing stages to synchronize the operation of the initializer 402, the finite state machine 404, and the KASUMI cipher block 412.

Figure 5A:
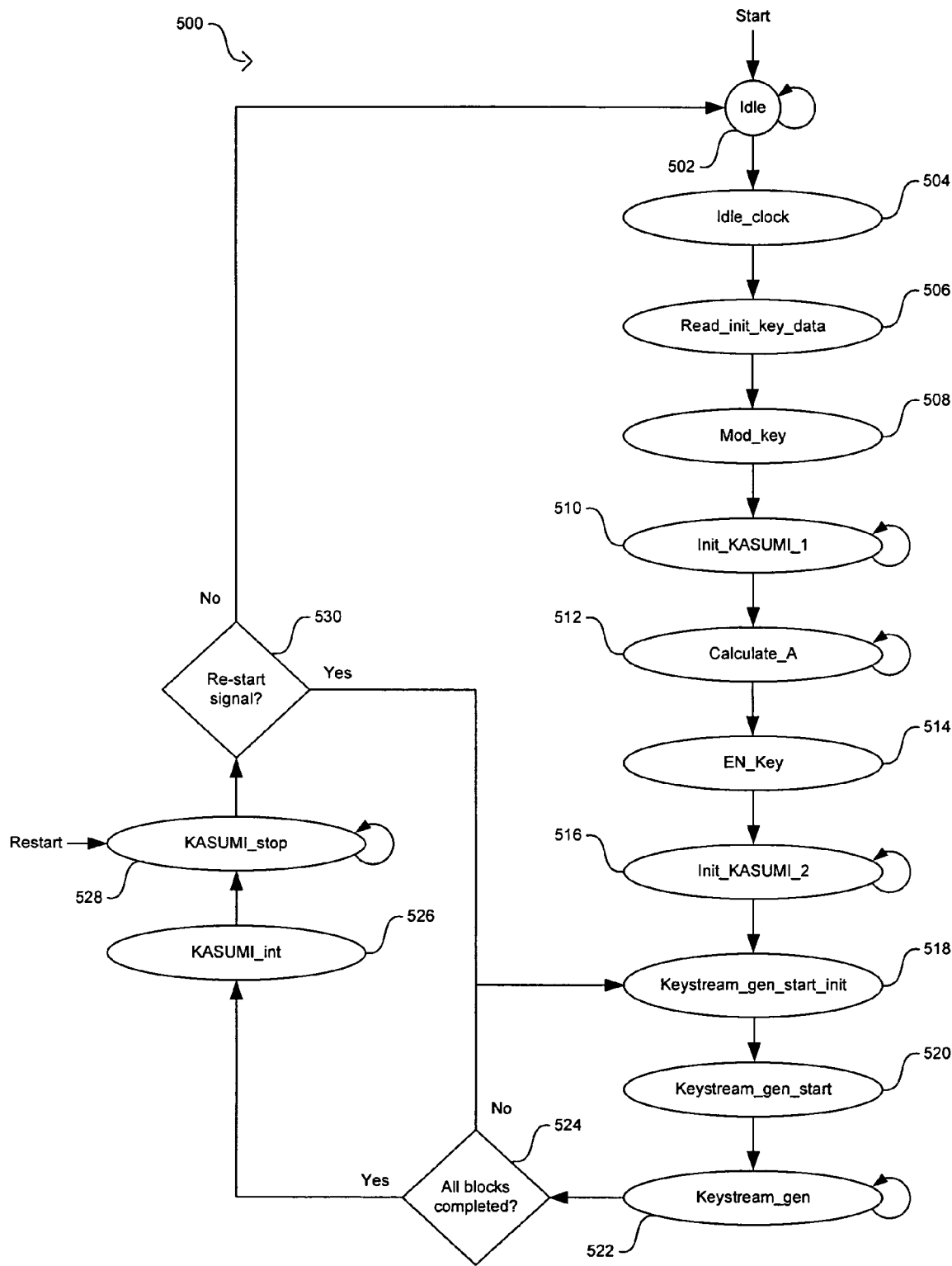
FIG. 5A is an exemplary state diagram illustrating the operation of the finite state machine in the GEA3 keystream generating system, in accordance with an embodiment of the invention.

FIG. 5A is an exemplary state diagram illustrating the operation of the finite state machine in the GEA3 keystream generating system, in accordance with an embodiment of the invention. Referring to FIG. 5A, the finite state machine 404 may remain in an idle state 502 until a start signal is received. The start signal received in idle state 502 may be an asynchronous signal and may need to be synchronized to the system clock. Once the start signal is received, the finite state machine 404 may proceed to an idle_clock state 504, where the internal clocks in the finite state machine 404 may be powered up after being powered down previously to conserve energy while the A5/3 keystream generating system 400 was not in use. Once the internal clocks have been powered up, the start signal may be synchronized and the finite state machine 404 may proceed to a read_init_key_data state 506, where the cipher key parameter CK and the initialized data may be transferred from the initializer 402.

With the cipher key parameter CK available for processing, the finite state machine 404 may generate the modified cipher key parameter (MCK) in a mod_key state 508. After the modified cipher key parameter MCK has been determined, the finite state machine 404 may proceed to an init_KASUMI_1 state 510, where the set of subkeys for use during the initializing KASUMI operation may be determined by the key scheduler 406 in FIG. 4. The finite state machine 404 may remain in the init_KASUMI_1 state 510 for a specified amount of time, for example, two clock cycles, until the combinational logic in the key scheduler 406 completes generating all the subkeys. In another embodiment, the finite state machine 404 may require the key scheduler 406 to generate and transfer the subkeys to the KASUMI cipher block 412 in FIG. 4 during the initializing KASUMI operation instead of before the initializing KASUMI operation begins.

With the initializing subkeys available for processing, the finite state machine 404 may proceed to a calculate_A state 512, where the KASUMI cipher block 412 may determine the intermediate value A, may transfer the determined intermediate value A to the finite state machine 404, and may generate the KASUMI_done signal to indicate that the intermediate value A has been determined. After completing the calculate_A state 512, the finite state machine 404 may proceed to an en_key state 514, where the cipher key parameter CK may be transferred to the key scheduler 406. After the cipher key parameter CK is transferred to the key scheduler 406, the finite state machine 404 may proceed to an init_KASUMI_2 state 516, where the set of subkeys for use during the first processing stage and any of the additional processing stages may be determined by the key scheduler 406.

With the set of subkeys necessary to generate the output keystream available, the finite state machine 404 may proceed to a keystream_gen_start_init state 518, where the first processing stage may begin by setting the parameters BLKCNT and $KSB_0$ to zero. Following the keystream_gen_start_init state 518, the finite state machine 404 may proceed to a keystream_gen_start state 520, where the KASUMI_start signal may be generated to initiate the KASUMI operation in the KASUMI cipher block 412 for the first processing stage. The finite state machine 404 may then proceed to a keystream_gen state 522, where the KASUMI cipher block 412 may determine the first processing block of output bits, may transfer the first processing block of output bits to the finite state machine 404, and may generate the KASUMI_done signal to indicate that the first processing block of output bits has been generated.

In step 524, the finite state machine 404 may determine whether the last processing block of output bits has been determined based on the value of parameter CL by determining whether BLKCNT=(BLOCKS−1) after the KASUMI_done signal is generated during the keystream_gen state 522. When the BLKCNT does not correspond to the last processing stage, as is the case when the current processing stage is that of the first processing block of output bits, the finite state machine 404 may proceed to the keystream_gen_start_init state 518 and update the BLKCNT and $KSB_{n-1}$ parameters for use during the next processing stage. Additional processing blocks of output bits may be determined by repeating the keystream_gen_start_init state 518, the keystream_gen_start state 520, and the keystream_gen state 522 for each of the additional processing stages. Referring back to step 524, when the BLKCNT corresponds to the last processing stage as determined from parameter CL, the finite state machine 404 may proceed to a KASUMI_int state 526, where the finite state machine 404 may generate the GEA3_int interrupt signal to indicate that all the output bits for the output keystream have been generated and the GEA3 keystream generating system 400 is ready to start processing a new set of input variables or to receive a restart signal.

In a KASUMI_stop state 528 the finite state machine 404 may await for a restart signal for a specified duration of time. In step 530, the finite state machine 404 may determine whether the restart signal has been received. When the restart signal has been received, the finite state machine 404 may proceed from the KASUMI_stop state 528 to the keystream_gen_start_init state 518 to process any subsequent processing blocks of output bits that may have to be generated by the GEA3 keystream generating system 400. Subsequent processing blocks of output bits may be determined by repeating the keystream_gen_start_init state 518, the keystream_gen_start state 520, and the keystream_gen state 522 for each of the subsequent processing stages.

Referring back to step 530, when the finite state machine 404 does not receive the restart signal within the specified amount of time it may proceed back to the idle state 502 to wait for the next start signal to be received. In the KASUMI_stop state 528 the finite state machine 404 may generate the OUTPUT parameter of the GPRS variant of the GEA3 encryption algorithm from the CO parameters generated by the GEA3 keystream generating system 400.

Figure 5B:
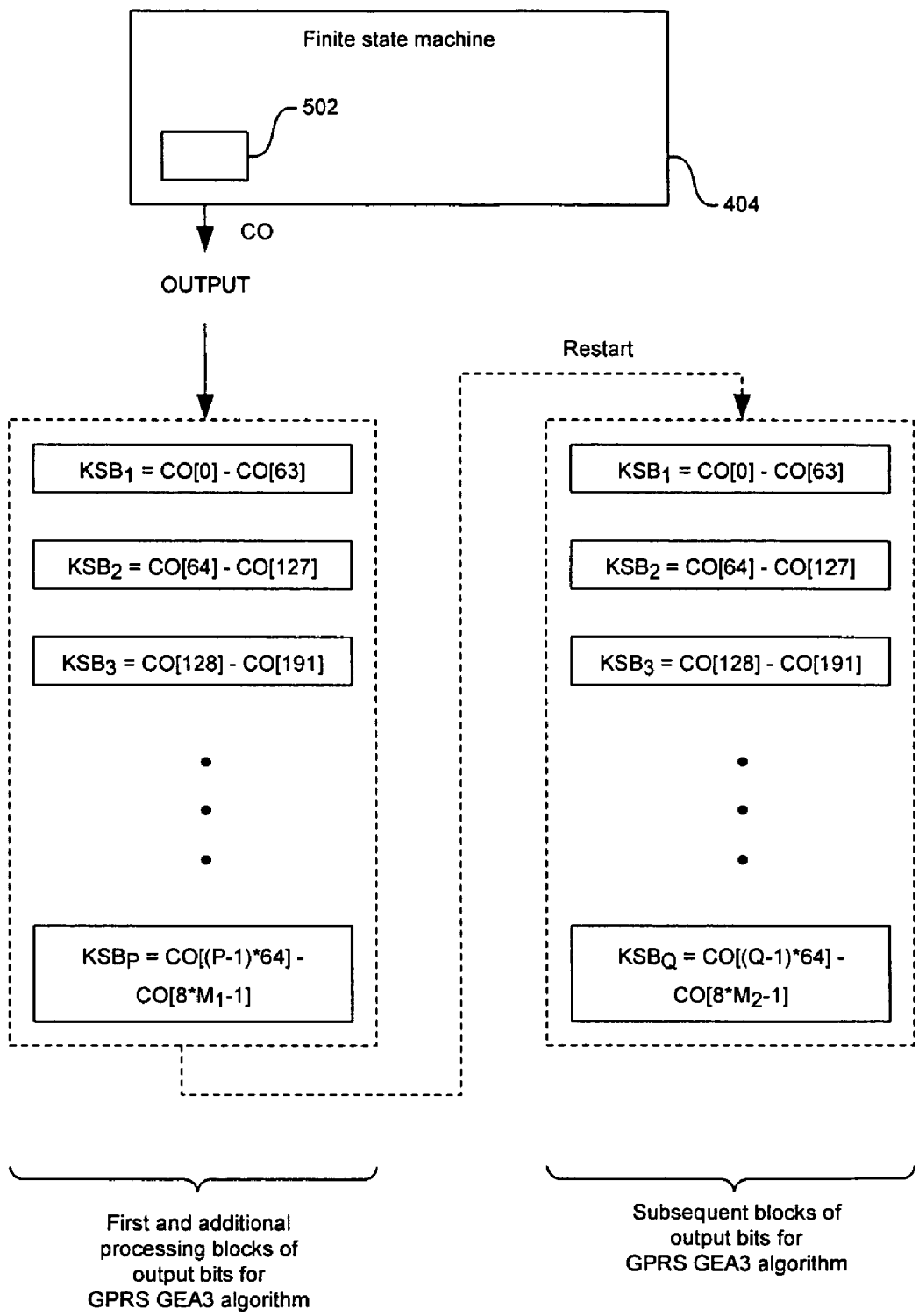
FIG. 5B illustrates the generation of an exemplary OUTPUT keystream by the finite state machine for GPRS applications, in accordance with an embodiment of the invention.

FIG. 5B illustrates the generation of an exemplary OUTPUT keystream by the finite state machine for GPRS applications, in accordance with an embodiment of the invention. Referring to FIG. 5B, the finite state machine 404 in FIG. 4 may also comprise an output buffer 502. The output buffer 502 may comprise suitable logic, circuitry, and/or code that may be adapted to group the output bits CO to generate the OUTPUT keystream for the GPRS variant of the GEA3 algorithm. For GPRS applications, the output buffer 502 may group the first processing block of output bits and any additional processing blocks of output bits necessary to complete the total of $8*M_1$ output bits into the OUTPUT keystream. In the exemplary OUTPUT keystream shown in FIG. 5B, the output buffer 502 may group P processing blocks of output bits into the OUTPUT keystream, where P is such that $M_1>24$ so that at least three processing stages are performed. Because the finite state machine 404 may receive a restart signal to generate subsequent processing blocks of output bits utilizing the cipher key Kc, the OUTPUT keystream may be extended to include the subsequent processing blocks of output bits. In the exemplary OUTPUT keystream shown in FIG. 5B, output buffer 502 may group Q subsequent processing blocks of output bits into the OUTPUT keystream, where Q is such that $M_2>24$ so that at least three subsequent processing stages are performed and $M_2$ may be different from $M_1$.

The approach described above may produce a cost effective IC solution capable of accelerating the encryption and decryption speed of the GPRS variant of the GEA3 algorithm and allow for a faster deployment of next generation data services.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for encryption, the method comprising:
implementing GEA3 encryption by:
initializing, by one or more circuits, a keystream generator with input variables;
generating, by said one or more circuits, an intermediate value which is utilized to generate an output keystream, based on said input variables, a cipher key and a key modifier;
after generating, by said one or more circuits, a first processing block of output bits and an indicator indicating when said first processing block of output bits is generated, generating, by said one or more circuits, at least one additional processing block of output bits utilizing an immediately generated previous processing block of output bits, said generated intermediate value, said cipher key, and an indication corresponding to a processing block of output bits being processed, wherein said generating of at least one additional processing block of output bits is done after an indicator indicating when an immediately generated previous processing block of output bits is generated; and
in response to receiving, by said one or more circuits, an indicator indicating that at least one subsequent processing block of output bits is to be generated utilizing said cipher key, generating, by said one or more circuits, at least one subsequent processing block of output bits utilizing an immediately generated previous processing block of output bits, said generated intermediate value, said cipher key, and an indication corresponding to a processing block of output bits being processed, wherein said generating of at least one subsequent processing block of output bits is done after an indicator indicating when an immediately generated previous processing block of output bits is generated.

2. The method according to claim 1, comprising pipelining transfer said immediately generated previous processing block of output bits from a previous processing stage to a current processing stage when said indicator indicating when said immediately generated previous processing block of output bits is generated.

3. The method according to claim 1, comprising generating a modified cipher key by XORing said cipher key and said key modifier.

4. The method according to claim 3, comprising generating said intermediate value by performing a KASUMI operation on said input variables with said modified cipher key after an indicator is generated to indicate that said KASUMI operation is to begin.

5. The method according to claim 1, comprising generating a first processing input by XORing said generated intermediate value and said indication corresponding to a processing block of output bits being processed.

6. The method according to claim 5, comprising generating said first processing block of output bits by performing a KASUMI operation on said generated first processing input with said cipher key after an indicator is generated to indicate that said KASUMI operation is to begin.

7. The method according to claim 1, comprising generating at least one additional processing input to generate said at least one additional processing block of output bits by XORing said immediately generated previous processing block of output bits with the result of XORing said generated intermediate value and said indication corresponding to a processing block of output bits being processed.

8. The method according to claim 7, comprising generating said at least one additional processing block of output bits by performing a KASUMI operation on said generated at least one additional processing input with said cipher key after an indicator is generated to indicate that said KASUMI operation is to begin.

9. The method according to claim 1, comprising generating at least one subsequent processing input to generate said at least one subsequent processing block of output bits by XORing the result of XORing said generated intermediate value and said indication corresponding to a processing block of output bits being processed with said immediately generated previous processing block of output bits.

10. The method according to claim 9, comprising generating said at least one subsequent processing block of output bits by performing a KASUMI operation on said generated at least one subsequent processing input with said cipher key after an indicator is generated to indicate that said KASUMI operation is to begin.

11. The method according to claim 1, comprising generating at least a portion of a set of subkeys utilized during a KASUMI operation from said cipher key after an indicator is generated to indicate that said at least a portion of a set of subkeys is to be generated.

12. The method according to claim 1, comprising selecting between said input variables and at least one generated processing input as an input to a KASUMI operation.

13. The method according to claim 1, comprising generating said indication corresponding to a processing block of output bits being processed by counting the number of occurrences of said indicator indicating when an immediately generated previous processing block of output bits is generated.

14. The method according to claim 1, comprising generating an indicator indicating that a last of said at least one additional processing block of output bits is generated.

15. The method according to claim 1, comprising generating an indicator indicating that a last of said at least one subsequent processing block of output bits is generated.

16. The method according to claim 1, comprising generating a final set of blocks of output bits based on said first processing block of output bits, said at least one additional processing blocks of output bits, and said at least one subsequent processing blocks of output bits.

17. A system for encryption, the system comprising:
one or more circuits for implementing GEA3 encryption, wherein said one or more circuits are operable to initialize a keystream generator with input variables;
said one or more circuits are operable to generate an intermediate value which is utilized to generate an output keystream, based on said input variables, a cipher key and a key modifier;
said one or more circuits are operable to generate a first processing block of output bits and an indicator indicating when said first processing block of output bits is generated;
said one or more circuits are operable to generate at least one additional processing block of output bits utilizing an immediately generated previous processing block of output bits, said generated intermediate value, said cipher key, and an indication corresponding to a processing block of output bits being processed, wherein said generating of at least one additional processing block of output bits is done after an indicator indicating when an immediately generated previous processing block of output bits is generated;
said one or more circuits are operable to receive an indicator indicating that at least one subsequent processing block of output bits is to be generated utilizing said cipher key; and said one or more circuits are operable to generate at least one subsequent processing block of output bits utilizing an immediately generated previous processing block of output bits, said generated intermediate value, said cipher key, and an indication corresponding to a processing block of output bits being processed, wherein said generating of at least one subsequent processing block of output bits is done after an indicator indicating when an immediately generated previous processing block of output bits is generated.

18. The system according to claim 17, wherein said one or more circuits are operable to pipeline transfer said immediately generated previous processing block of output bits from a previous processing stage to a current processing stage when said indicator indicating when said immediately generated previous processing block of output bits is generated.

19. The system according to claim 17, wherein said one or more circuits are operable to generate a modified cipher key by XORing said cipher key and said key modifier.

20. The system according to claim 19, wherein said one or more circuits are operable to generate said intermediate value by performing a KASUMI operation on said input variables with said modified cipher key after an indicator is generated to indicate that said KASUMI operation is to begin.

21. The system according to claim 17, wherein said one or more circuits are operable to generate a first processing input by XORing said generated intermediate value and said indication corresponding to a processing block of output bits being processed.

22. The system according to claim 21, wherein said one or more circuits are operable to generate said first processing block of output bits by performing a KASUMI operation on said generated first processing input with said cipher key after an indicator is generated to indicate that said KASUMI operation is to begin.

23. The system according to claim 17, wherein said one or more circuits are operable to generate at least one additional processing input to generate said at least one additional processing block of output bits by XORing said immediately generated previous processing block of output bits with the result of XORing said generated intermediate value and said indication corresponding to a processing block of output bits being processed.

24. The system according to claim 23, wherein said one or more circuits are operable to generate said at least one additional processing block of output bits by performing a KASUMI operation on said generated at least one additional processing input with said cipher key after an indicator is generated to indicate that said KASUMI operation is to begin.

25. The system according to claim 17, wherein said one or more circuits are operable to generate at least one subsequent processing input to generate said at least one subsequent processing block of output bits by XORing the result of XORing said generated intermediate value and said indication corresponding to a processing block of output bits being processed with said immediately generated previous processing block of output bits.

26. The system according to claim 25, wherein said one or more circuits are operable to generate said at least one subsequent processing block of output bits by performing a KASUMI operation on said generated at least one subsequent processing input with said cipher key after an indicator is generated to indicate that said KASUMI operation is to begin.

27. The system according to claim 17, wherein said one or more circuits are operable to generate at least a portion of a set of subkeys utilized during a KASUMI operation from said cipher key after an indicator is generated to indicate that said at least a portion of a set of subkeys is to be generated.

28. The system according to claim 17, wherein said one or more circuits are operable to select between said input variables and at least one generated processing input as an input to a KASUMI operation.

29. The system according to claim 17, wherein said one or more circuits are operable to generate said indication corresponding to a processing block of output bits being processed by counting the number of occurrences of said indicator indicating when an immediately generated previous processing block of output bits is generated.

30. The system according to claim 17, wherein said one or more circuits are operable to generate an indicator indicating that a last of said at least one additional processing block of output bits is generated.

31. The system according to claim 17, wherein said one or more circuits are operable to generate an indicator indicating that a last of said at least one subsequent processing block of output bits is generated.

32. The system according to claim 17, wherein said one or more circuits are operable to generate a final set of blocks of output bits based on said first processing block of output bits, said at least one additional processing blocks of output bits, and said at least one subsequent processing blocks of output bits.

* * * * *

UNITED STATES PATENT AND TRADEMARK OFFICE
CERTIFICATE OF CORRECTION

PATENT NO. : 7,627,115 B2 Page 1 of 1
APPLICATION NO. : 10/924177
DATED : December 1, 2009
INVENTOR(S) : Suen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1469 days.

Signed and Sealed this

Second Day of November, 2010

David J. Kappos
*Director of the United States Patent and Trademark Office*